United States Patent [19]
Carey

[11] Patent Number: 5,518,628
[45] Date of Patent: * May 21, 1996

[54] PURIFICATION PROCESS

[75] Inventor: Richard J. Carey, Sherborn, Mass.

[73] Assignee: Shipley Company Inc., Marlborough, Mass.

[*] Notice: The portion of the term of this patent subsequent to Oct. 27, 2013, has been disclaimed.

[21] Appl. No.: 149,041

[22] Filed: Nov. 8, 1993

[51] Int. Cl.$^6$ ............................................. B01J 47/04
[52] U.S. Cl. ............................................. 210/686
[58] Field of Search .......................... 210/674, 681, 210/683, 685, 686

[56] References Cited

U.S. PATENT DOCUMENTS 3,849,306  11/1974  Anderson ............................ 210/685
4,540,493  9/1985  Dickerson et al. .................. 210/674
4,737,487  4/1988  Watts et al. .......................... 514/15

FOREIGN PATENT DOCUMENTS 1228560  9/1989  Japan .
92/12152  6/1993  WIPO .

*Primary Examiner*—Ivars Cintins
*Attorney, Agent, or Firm*—Robert L. Goldberg

[57] ABSTRACT

The invention is for a process of removal of ionic contaminants from an organic solution. The process of the invention involves providing a mixed ion exchange resin modified by contact with an ammonium salt of a weak organic acid and contacting said organic solution with said modified exchange resin for a time sufficient to remove ionic impurities therefrom. The invention is useful for removal of ionic contaminants from organic solutions requiring high purity for use.

17 Claims, No Drawings

PURIFICATION PROCESS

BACKGROUND OF THE INVENTION

1. Introduction

This invention relates to removal of contaminants from organic solutions. More particularly, this invention relates to removal of metallic and non-metallic dissolved contaminants from organic solutions. The invention is especially useful for the removal of contaminants from solutions used in integrated circuit manufacture.

2. Description of the Prior Art

Ultra pure liquids free of particulate, ionic and organic contamination are required for many industrial purposes such as for the manufacture of pharmaceuticals and integrated circuits. For example, in the manufacture of high resolution integrated circuits, it is known that many processing liquids come into contact with a bare wafer or a resist coated surface. These include photoresists and treatment chemicals such as organic liquids and aqueous solutions which contain acids, bases, oxidants, and other proprietary ingredients. At least 15 to 50 liquids of various compositions are used to clean wafers, prime surfaces, deposit resists or other polymers, develop, rinse, etch, and strip the resist. It is known that these solutions may be a source of contamination of the integrated circuit wafer that can interfere with its performance. Thus, the reduction or removal of insoluble and soluble contaminants from processing fluids used for the production of integrated circuits before or during use is basic insurance for prevention of damage to the integrated circuit.

Photoresist coating compositions are used extensively in integrated circuit manufacture. Such compositions typically comprise a light-sensitive component and a polymer binder dissolved in a solvent. Typical photoresist compositions are disclosed in U.S. Pat. Nos. 5,178,986; 5,212,046; 5,216,111; and 5,238,776, each incorporated herein by reference for disclosure of photoresist compositions, processing, and use.

It is known that photoresist coating compositions contain particulate and ionic contaminants. For example, it is known that solid gels or insolubles form in photoresists due to dark reactions. In addition, soluble impurities such as moisture, silicone oils, plasticizers, and metal ions may be present from the manufacture of the resist components and from the packaging containers or dispensing tanks. Trapped bubbles from point-of-use filtration or the shaking of a resist bottle prior to dispensing can lead to defects in resist coatings. In Class 100 clean rooms, airborne particulate counts amount to 3 particles per liter of density of 2. By comparison, liquids contain about 100,000 particles per liter. A particle count of 100,000 per liter seems high, but if translated into a solid of 0.6μ in size (entity of 2), this is equivalent to 10 parts per million (ppm). A level of 10 ppm amounts to the deposition of 1 mg per liter. Since liquids are heavily contaminated compared to clean room air, effective contaminant removal is essential to the manufacture of such devices. Ultrafiltration of resist liquids has progressed and manufacturers of resist now supply resist materials filtered through 0.04 μM diameter absolute filters.

Methods useful for removal of particulates from treatment solutions are not effective for removal of dissolved contaminants from solution such as organic impurities and ionic species. These contaminants can be at least as damaging to an integrated circuit as particulate contamination.

The removal of dissolved cationic and anionic contaminants from treatment solutions used to manufacture integrated circuits is known in the art. For example, one such method is disclosed in International Publication No. WO 93/12152, incorporated herein by reference, which is directed to removing metal ions such as sodium and iron from novolak resins during manufacture. The process comprises cation exchange treatment whereby a cation exchange resin is first washed with a mineral acid solution to reduce the level of total sodium and iron ions within the exchange resin to preferably less than 100 ppb, passing a formaldehyde reactant through the so treated cation exchange resin to decrease the sodium and iron ion content to less than 40 ppb, passing a phenolic compound through the cation exchange resin to decrease its sodium and iron ion content to less than 30 ppb, and then condensing the so treated phenolic compound with formaldehyde in the presence of an acid catalyst to form the resin.

A method for removal of ionic metals and non-metals from a photoresist is disclosed in published Japanese Patent Application No. 1228560 published Sep. 12, 1989, incorporated herein by reference. In accordance with the procedures of this patent, a photosensitive resin is passed through a mixed bed of a cation exchange resin and an anion exchange resin to simultaneously remove cation and anionic species from the photoresist solution.

In copending U.S. patent application Ser. No. 08/128,994, filed Sep. 30, 1993, assigned to the same assignee as the subject application and incorporated herein by reference, an improved process is disclosed for removing metallic cations from organic solutions using modified cation exchange resins. In accordance with the process of the invention disclosed therein, the cation exchange resin is modified by replacement of the acid protons on the cation exchange groups with essentially neutral groups such as ammonium or amine groups. Thereafter, an organic solution containing acid labile components may be treated with the modified cation exchange resin to remove metal ions without the formation of undesired by-products caused by attack of acid protons on acid labile groups.

In copending U.S. patent application Ser. No. 08/143,489 filed Oct. 27, 1993, assigned to the same assignee as the subject application and incorporated herein by reference, an improved process is disclosed for removing anions from organic solutions using a modified anion exchange resin. In accordance with the process of the invention disclosed therein, the anion exchange resin is modified by replacement of the strongly basic groups on the anion exchange groups with essentially neutral or slightly acid groups such as acetate or citrate. Thereafter, an organic solution containing base labile components may be treated with the modified anion exchange resin to remove non-metallic anions without the formation of undesired by-products caused by attack of the strong base on a base labile groups.

The processes described in the above-identified copending applications are suitable for the removal of dissolved cations and anions from solutions containing a base labile or an acid labile solution. However, there are many organic solutions that contain both a base labile and an acid labile material and a process and a treatment material are needed whereby dissolved contaminants may be removed from such a solution by a simple, one step process.

SUMMARY OF THE INVENTION

In accordance with the invention, a process is provided whereby organic solutions are treated to remove contaminants from an organic solution containing both an acid labile and a base labile material. The process comprises providing a mixed bed of a cation and anion exchange resin that has been treated with an ammonium salt of a weak acid and passing an organic solution containing acid and base labile components through said bed to remove dissolved ionic contaminants.

Treatment of the mixed bed of exchange resins with an ammonium salt of a weak acid results in displacement of strong acid protons with a weak acid and displacement of strong basic anions with an essentially non-basic ammonium anion. Displacement of the strong acid and base from the exchange resin permits treatment of organic solutions containing acid and base labile materials without undesired by-product formation. The invention is especially useful for the purification of photoresist formulations.

DESCRIPTION OF THE PREFERRED EMBODIMENTS

The process of the invention is applicable to any organic solution containing dissolved contaminants but is especially useful for treating photoresist compositions containing dissolved ionic contaminants. Accordingly, the description that follows will for the most part exemplify photoresist purification procedures, but the invention should not be construed as limited to this embodiment.

Photoresists are well known and described in numerous publications including DeForest, *Photoresist Materials and Processes*, McGraw-Hill Book Company, New York, Chapter 2, 1975 and Moreau, *Semiconductor Lithography, Principles, Practices and Materials*, Plenum Press, New York, Chapters 2 and 4, 1988, incorporated herein by reference.

Suitable positive-working photoresists typically contain two components—a light-sensitive compound and a film-forming polymeric binder where the light-sensitive component undergoes photochemical alteration upon exposure. Single component systems are known and typically comprise a polymer that undergoes chain scission upon exposure. The light-sensitive compounds most frequently used in two-component resist systems are esters formed from o-quinone diazide sulfonic acids, especially sulfonic acid esters of naphthoquinone diazides. These esters are well known and described by DeForest, supra, pages 47–55 and by Moreau, supra, pages 34–52. The light-sensitive compounds and the methods used to make the same are all documented in prior patents including U.S. Pat. Nos. 3,046,110; 3,046,112; 3,046,119; 3,046,121; 3,106,465; 4,596,763; and 4,588,670, all incorporated herein by reference.

The polymer binders most frequently used for positive-working photoresists in conjunction with o-quinone diazides are the alkali soluble phenol formaldehyde resins known as the novolak resins. Photoresists using such polymers are illustrated in U.S. Pat. Nos. 4,377,631 and 4,404,272. Another class of binders used with o-quinone diazides are homopolymers and copolymers of vinyl phenol. Photoresists of this nature are disclosed in U.S. Pat. No. 3,869,292.

Negative-working resists may also be treated in accordance with the invention and are well known in the art. Such photoresists typically undergo random crosslinking upon exposure to activating radiation thereby forming areas of differential solubility. Such resists often comprise a polymer and a photoinitiator. One class of negative-working resists comprise, for example, polyvinyl cinnamates as disclosed by R. F. Kelly, *Proc. Second Kodak Semin. Micro Miniaturization*, Kodak Publication P-89, 1966, p. 31. Other negative-acting resists include polyvinylcinnamate acetates as disclosed in U.S. Pat. No. 2,716,102; azide cyclized rubber as disclosed in U.S. Pat. No. 2,940,853; polymethylmethacrylate/tetraacrylate as disclosed in U.S. Pat. No. 3,149,975; polyimide-methyl methacrylate as disclosed in U.S. Pat. No. 4,180,404; and polyvinyl phenol azide as disclosed in U.S. Pat. No. 4,148,655.

Another class of photoresists for purposes of the invention are those positive and negative acid-hardening resists disclosed in EPO application Serial No. 0 232 972 in the name of Feely et al. These photoresists comprise an acid-hardening resin and a halogenated, organic, photoacid generating compound.

Substantially all components of the photoresist composition are a potential source of dissolved contaminants. The contaminants may be metallic cations such as sodium, potassium, iron, copper, chromium, nickel, molybdenum and zinc; non-metallic anions such as halides, nitrates, sulphates, phosphates, borates, or chromates; or dissolved organics such as azo and diazo dyes, diazides, and by-products and unreacted materials present as a consequence of the process used to manufacture any one or more of the components of the photoresist.

It is known in the art to treat photoresist solutions and solutions of photoresist components with exchange resins to remove dissolved ionic contaminants. It is also known that many organic solutions including photoresist compositions contain acid labile groups, base labile groups, or both that are subject to attack by exchange materials.

Photoresist components containing acid labile groups include solvents such as esters and dibasic esters such as ethyl lactate and diethylsuccinate; lactones such as gamma butyrolactones; amides such as dimethyl formamide and n-methylpyrrolidone; acetals such as pyruvic aldehyde, dimethyl acetal; and ketals. Resins used in photoresist compositions containing acid labile groups include phenolic resins having t-butyloxycarbonate esters or t-butyl acetate substitution; epoxy novolak resins; aminoplasts such as melamine resins; polyesters; polyamides; polysulfonates; polyacrylate esters; and polyacetals. Photoactive components containing acid labile groups include the diazo naphthoquinone sulfonate esters. Other materials used in photoresist compositions possessing acid labile groups include dyes such as curcumin dye, ethyl red dye, rhodamine, etc. In the case of dyes, a strong acid may not only alter the chemical composition, but also the spectral sensitivity of the resist.

Photoresist compositions containing base labile groups include solvents such as esters, ethers and ketones. Typical resins used in photoresist compositions containing base labile groups include epoxies, polyamides and polysiloxanes. Typical photoactive compounds used in photoresist compositions containing base labile groups include the diazonaphthoquinone sulfonate esters. Other materials used in photoresist compositions or otherwise in integrated circuit manufacture possessing base labile groups include epoxy compounds, vinyl ethers, compounds containing triaryl methyl groups, spin-on glass formulations, compounds containing Si-N bonds, Si-halogen bonds, C-P bonds, C-halogen bonds, siloxanes, etc.

The process of the invention comprises provision of a mixed bed of a cation exchange resin and an anion exchange resin modified by treatment with an ammonium salt of a weak acid. Cation and anion exchange resins that may be modified in accordance with the invention are known and described in numerous publications. For example, suitable cationic exchange materials are disclosed in the aforesaid U.S. Pat. No. 5,234,789 and Japanese Applications Nos.

5148309, 91339728, 5148306, and 4065415, each incorporated herein by reference for the disclosure of suitable cationic exchange resins. Preferred cationic exchange resins are those having sulfonate groups on a polymer backbone such as a sulfonated styrene-divinylbenzene crosslinked polymer. The most preferred cationic exchange resin is a sulfonated styrene polymer sold under various trade names such as Dowex 5OX8 by Dow Chemical or IRN 77 or IR 118H by Rohm and Haas Company.

Suitable anion exchange materials are also known and disclosed in Japanese published patent application No. 1228560 (published Sep. 12, 1989), incorporated herein by reference, and in Samuelson, *Ion Exchange Separations in Analytical Chemistry,* John Wiley & Sons, New York, 1963, Chapter 2, also incorporated herein by reference. Preferred anion exchange resins are resins having structurally bound quaternary ammonium hydroxide exchange groups such as polystyrene-divinylbenzene resins substituted with tetramethyl ammonium hydroxide. A preferred anion exchange resin is crosslinked polystyrene having quaternary ammonium hydroxide substitution such as those ion exchange resins sold under the trade names Amberlyst A26-OH by Rohm and Haas Company and Dow G51-OH by Dow Chemical Company.

Single ion exchange resins having both anion and cation exchange groups on the backbone are also known. Such materials are commercially available such as that mixed ion exchange material identified as IRN mixed resin available from Rohm and Haas Company.

Any one or more of the above cation exchange resins and anion exchange resins are mixed to form a mixed ion exchange bed or a bed is formed from a single ion exchange resin having both anion and cation exchange groups. The ratio of the anion exchange groups to cation exchange groups is dependent upon the contaminants within the solution to be treated and the ratio is desirably proportional to the cation and anion contaminants in the solution to be purified. Typically, each exchange resin is present in an amount of from 25% to 75% by weight of the total bed and more preferably, in an amount of from 40% to 60%.

The mixed ion exchange resin bed is prepared for treatment of organic solutions by contact of the same with an aqueous solution of an ammonium salt of a weak acid, inclusive of quaternary ammonium salts. Halide salts should be avoided if the solution to be treated is a solution of a photoresist or photoresist component. Suitable salts include ammonium and quaternary ammonium salts of organic acids such as salts of formic acid, acetic acid, propionic acid, butyric acid, oxalic acid and succinic acid. The aqueous solution used to treat the mixed bed of ion exchange resins may contain the ammonium salt in a concentration of from 1 to 25 percent by weight and more preferably in a concentration of from 2 to 10 percent by weight.

Treatment of the mixed ion exchange bed is accomplished by contact of the ion exchange materials with the solution of the ammonium acid salt with the ion exchange materials. For example, a solution of the ammonium salt may be passed through a bed of the exchange materials or the exchange materials may be slurried with the ammonium salt solution. Contact time between exchange materials with the ammonium salt may vary between about 1 and 30 hours, more preferably, from about 4 to 10 hours. Thereafter, the so modified ion exchange resin is washed with water until a pH of about 7.0 to 7.8 is reached. Finally, the treated resin is preferably dehydrated by washing the resin with an aqueous miscible organic solvent such as ethyl lactate or acetone. The procedure can be performed at room or elevated temperature though elevated temperatures result in increased exchange efficiency, but with possible concomitant degradation of temperature sensitive materials.

Organic solutions are treated with the modified ion exchange resins by slurrying the same with the resin or by passing the solution through a column of a modified anion exchange resin. The rate of passage of the solution through the column can vary between about 2 and 20 bed volumes per hour. Ambient conditions are suitable.

Though not wishing to be bound by theory, it is believed that the modification of the mixed ion exchange resins results in an essentially weak acid ion being available for exchange with the anionic contaminant rather than the —OH group as in the prior art thus reducing the affect of strong bases on base labile groups and an essentially non-acidic cation being available for exchange with metallic ions rather than acidic protons as in the prior art thus reducing the effect of acidic protons on acid labile groups.

EXAMPLE 1

An ion exchange column is prepared by treating 100 grams of an ion exchange resin mixture containing both anion and cation exchange groups identified as IRN-150 Mixed Ion Exchange available from Rohm and Haas Company. The ion exchange resin is treated with 200 mls of a 10% by weight solution of ammonium acetate. The resin is allowed to remain in the solution for 4 hours. The resin is then rinsed with 10 volumes of deionized water and dehydrated by several rinses with acetone. The acetone is then displaced with ethyl lactate and the resin is packed into a column. A photoresist identified as SPR2® Photoresist of Shipley Company Inc. is passed through the column. This photoresist comprises a phenolic binder and a light-sensitive system consisting of an aminoplast and an acid generator. The photoresist solution is passed through the column at a flow rate of 4 bed volumes per hour. Analysis revealed that sodium levels within the photoresist decreased from 230 ppb to less than 10 ppb by this treatment. Chloride levels were also decreased from an initial level of 730 ppb to 75 ppb.

EXAMPLE 2

An ion exchange material identified as MR3 Mixed Ion Exchange Resin available from Dow Chemical Company is prepared by treating 100 grams of this material with 200 mls of a 10% solution of tetramethyl ammonium acetate for 4 hours. The tetramethyl ammonium acetate used was prepared by neutralizing tetramethyl ammonium hydroxide with acetic acid. Following preparation of the ion exhange material, it is washed with 10 rinses of deionized water and swelled to its appropriate size by placement in a photoresist developer solution identified as MF®-319 Developer available from Shipley Company Inc. A column was then filled with the resin and 200 mls of the MF-319 Developer was passed through the column at a flow rate of 5–10 bed volumes per hour. Potassium levels were lowered from an initial level of 50 ppb to less than 1 ppb (the detection limit) by the treatment process. Chloride levels were lowered from 70 ppb to less than 5 ppb (the detection limit).

I claim:

1. A process for removing ionic contaminants from an organic solution containing acid and base labile solutes, said process comprising the steps of providing a mixed bed of cation and anion exchange resins which has been treated by contact with an ammonium salt of a weak acid and contacting said organic solution with said treated bed of exchange resins, the contact between the organic solution and the treated exchange resin being for a time sufficient to remove essentially all ionic contaminants from solution.

2. The process of claim 1 where the ammonium salt is an ammonium salt of a weak organic acid.

3. The process of claim 2 where the ammonium salt is a quaternary ammonium salt.

4. The process of claim 2 where the ammonium salt is a salt of an acid selected from the group consisting of formic acid, acetic acid, carbonic acid, propionic acid, butyric acid, malonic acid, succinic acid, citric acid, and lactic acid.

5. The process of claim 4 where the acid is acetic acid.

6. The process of claim 1 where the ionic contaminants comprise anions selected from the group consisting of halides, phosphates, nitrates, borates, sulfates and organic sulfonic acids.

7. The process of claim 1 where the ionic contaminants comprise cations selected from the group consisting of sodium and potassium.

8. A process for removing ions from an organic solution used for the preparation of an integrated circuit, said process comprising the steps of providing a mixed bed of cation and anion exchange resins, treating said exchange resins with an ammonium salt of an organic acid, and contacting said organic solution with said treated ion exchange resins for a time sufficient to remove essentially all ions from solution.

9. The process of claim 8 including the step of dehydrating the ion exchange resin by contact with an organic solvent between the steps of contact with the ammonium salt and contact with the organic solution.

10. The process of claim 8 where the ammonium salt is a salt of a halogen free organic acid.

11. The process of claim 10 where the ammonium salt is a salt of an acid selected from the group consisting of formic acid, acetic acid, carbonic acid, propionic acid, butyric acid, malonic acid, citric acid, lactic acid, and succinic acid.

12. The process of claim 11 where the organic acid is acetic acid.

13. The process of claim 8 where the organic solution is a solution of a photoresist.

14. The process of claim 13 where the photoresist solution contains base and acid labile solutes.

15. The process of claim 9 where the ions comprise anions selected from the group consisting of halides, phosphates, nitrates, borates, sulfates and organic sulfonic acids.

16. The process of claim 8 where the ions comprise cations selected from the group consisting of sodium and potassium.

17. The process of claim 8 where the ions comprise a mixture of cations and anions.

\* \* \* \* \*